May 14, 1957  H. J. WOOD  2,792,197
GAS TURBINE APPARATUS
Original Filed Aug. 6, 1948  3 Sheets-Sheet 1
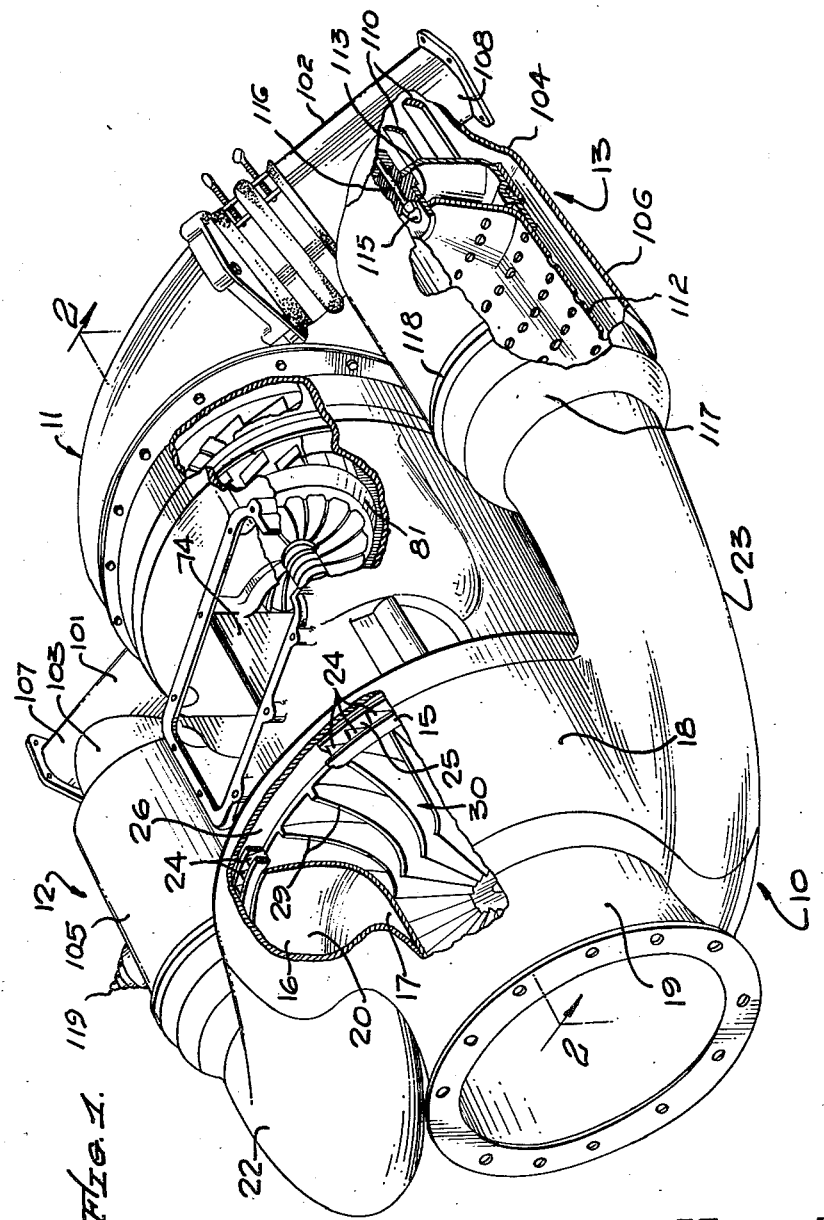
Homer J. Wood,
INVENTOR.
BY 
ATTORNEY May 14, 1957 H. J. WOOD 2,792,197
GAS TURBINE APPARATUS
Original Filed Aug. 6, 1948 3 Sheets-Sheet 2

Homer J. Wood,
INVENTOR.

BY
ATTORNEY

May 14, 1957     H. J. WOOD     2,792,197
GAS TURBINE APPARATUS
Original Filed Aug. 6, 1948     3 Sheets-Sheet 3
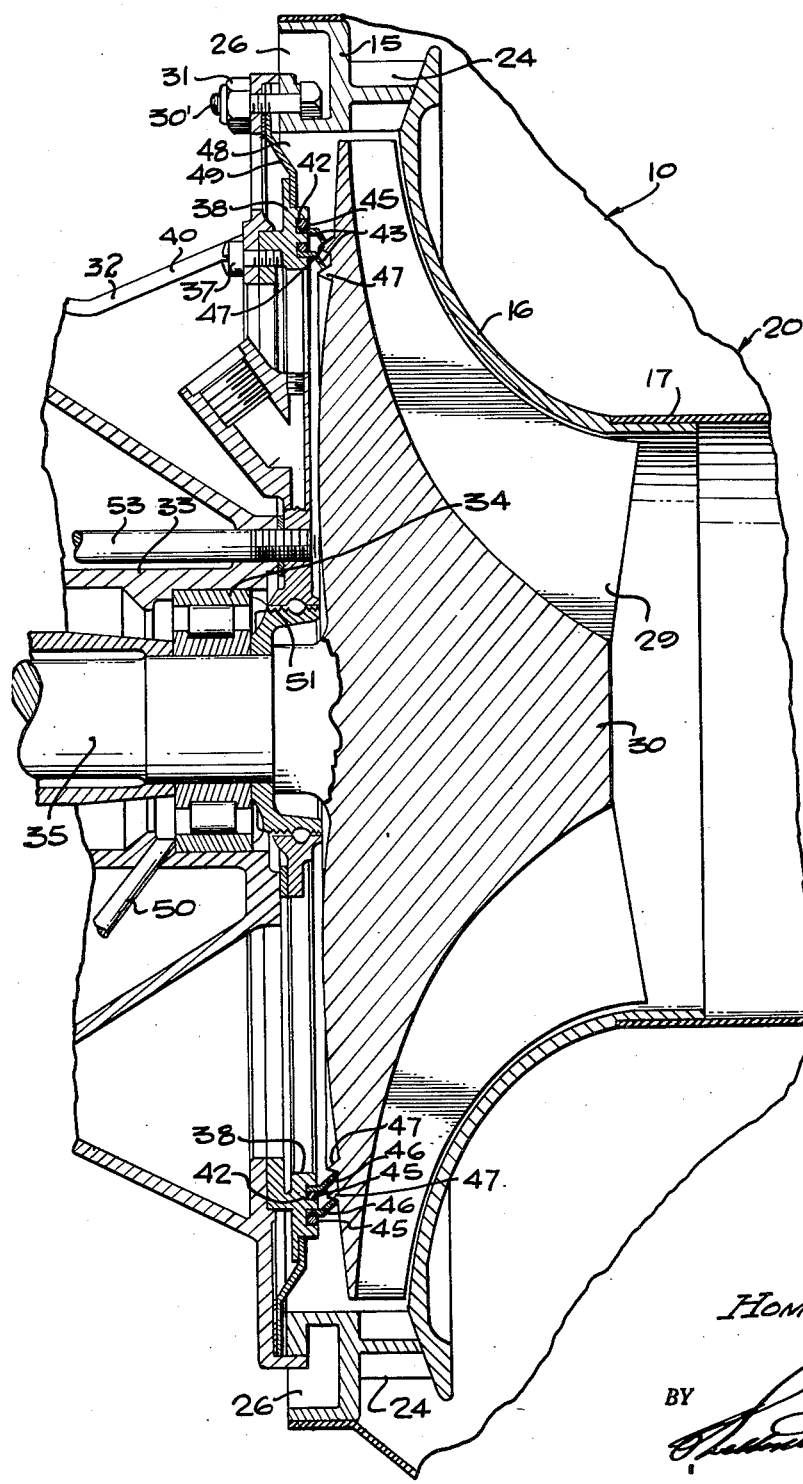
FIG. 3.
Homer J. Wood,
INVENTOR.
BY 
ATTORNEY

United States Patent Office 2,792,197
Patented May 14, 1957

2,792,197

GAS TURBINE APPARATUS

Homer J. Wood, Sherman Oaks, Calif., assignor to The Garrett Corporation, Los Angeles, Calif., a corporation of California Original application August 6, 1948, Serial No. 42,984, now Patent No. 2,648,491, dated August 11, 1953. Divided and this application April 9, 1953, Serial No. 347,721

1 Claim. (Cl. 253—55)

This invention relates generally to power means and, more particularly, to hot gas turbine apparatus especially adapted as a source of auxiliary power aboard an aircraft.

The present application is a division of my co-pending application, Serial No. 42,984, filed August 6, 1948, now Patent No. 2,648,491, issued August 11, 1953.

It is highly desirable in aircraft of the larger types that an auxiliary power means be provided for starting the engines, for operating electrical generators, cabin supercharging equipment and other accessories so that the full power developed by the aircraft engines can be utilized for propelling the airplane. It is also important that such an auxiliary power unit be very compact so that it occupies a minimum space, and light in weight so that the weight of the aircraft is not materially increased or its pay-load decreased to any appreciable degree.

It is an important object of this invention to provide a power unit which meets the above-noted requirements and which is highly efficient in operation, delivering maximum power per unit of weight.

Another object is to provide a power unit, of the class referred to, in which the individual components are designed such that the unit as a whole is small, compact and light in weight and thus particularly adapted for use in aircraft.

Another object is to provide a turbo-compressor power unit in which the hot gas turbine is of the radial inward-flow reaction type having radial blades. A turbine of this type is much simpler to manufacture than axial-flow turbines of comparable size and is capable of obtaining high efficiencies over a wide range of operating conditions. Moreover, the structural strength of such a turbine wheel is superior to one of comparable cantilever blade radial-flow type and to one of the axial-flow type.

Another object is to provide a power unit of the class referred to in which the turbine wheel and its shaft are machined from a single forging of refractory alloy, in which an air seal is provided at the rear of the wheel to balance axial thrust and in which the inner portion of the wheel is exposed to ambient air for cooling purposes.

Another object in this respect is to provide a turbine wheel of the radial inward-flow type, similar to a radial blade centrifugal compressor impeller, such a wheel lending itself to easier fabrication than conventional axial-flow wheels and having lower stresses than other wheels of radial-flow types.

A further object is to provide, in a turbine of the aforementioned type, a sealed turbine wheel to prevent loss of the pressurized gas from the turbine which would decrease the efficiency of the power unit in which the turbine is incorporated.

A still further and important object is to provide a hot gas turbine wherein the thrust on the wheel by the hot gas exhaust is balanced by an equal thrust on the outer peripheral back side of the wheel, which thrust is provided by the pressure of the hot gas at the exit from the nozzles, the remainder of the back side of the turbine wheel being cooled by ambient air.

Further objects of the invention will appear from the following detailed description and from the drawings, which are intended for the purpose of illustration only, and in which:

Fig. 1 is a perspective view of a turbine compressor power unit embodying the present invention;

Fig. 3 is an enlarged sectional view of a portion of the hot gas turbine, showing the sealing means.

Figure 2:
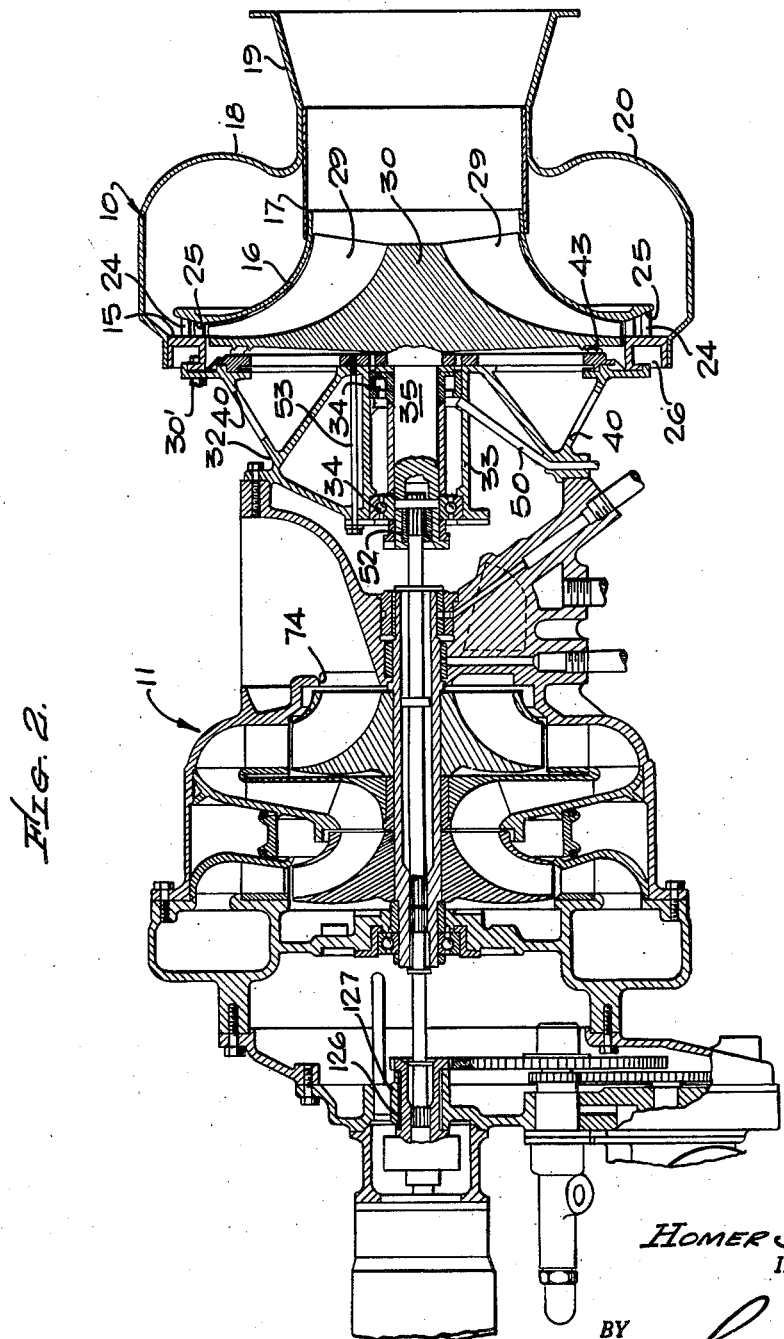
Fig. 2 is a longitudinal vertical sectional view, taken on line 2—2 of Fig. 1.

Referring to the drawings in detail, the present improved power plant shown therein is of the hot gas turbine compressor type and includes a hot gas turbine, indicated generally by the reference character 10, a two-stage compressor 11 and a pair of combustion chambers 12 and 13. The turbine 10 and compressor 11 are disposed in axial alignment and each comprises a separate component or assembly adapted to be readily interchanged.

The hot gas turbine 10 includes a nozzle ring 15 which has a stator shroud 16 secured thereto, the shroud being curved inwardly and terminating in a tubular forward end 17, the inner side of which provides the exhaust tube of the turbine. An enclosure 18 surrounds and is affixed to the tube 17 and has its forward flared end 19 projecting beyond the end of the tube to provide an axial extension thereof. The enclosure 18 extends radially outward from the tube 17 and then rearwardly to be secured to the nozzle annulus 15. An annular hot gas inlet passage 20 is thus provided between the shroud 16 and the enclosure 18 into which hot gas is introduced by way of curved tubes 22 and 23 leading from the combustion chambers 12 and 13, respectively. The nozzle annulus 15 is provided with a series of inclined vanes 24 around its periphery, the spaces 25 between the vanes constituting nozzles through which the hot gas is directed against the blades 29 of a turbine wheel 30, to be later described. The nozzle annulus 15 is substantially channel shaped in cross section so as to provide an annular air space 26 in its rearward face, as best shown in Figs. 2 and 3.

Secured to a flange of the nozzle annulus 15 by means of bolts 30' is the peripheral portion 31 of a bearing housing 32 which has an axial sleeve-like portion 33. Within the sleeve portion 33, at the ends thereof, are anti-friction bearings 34 which rotatably support the shaft 35 of the turbine wheel 30, it being noted that the shaft 35 is formed integral with the wheel so as to obtain maximum strength and close balance. It will also be observed that the turbine wheel is of somewhat unconventional design, in that it is of a radially inward-flow reaction type and resembles an impeller of the radial blade type such as commonly employed in centrifugal compressors where the air is forced radially outward by the blades.

Secured to the annular portion 31 of the bearing housing 32, by screws 37, is an annular carrier member 38. By this provision, ambient air can contact the back of the turbine wheel 30 for the purpose of cooling the same, the air entering the housing 32 through apertures 40 in the side thereof. In its face which is disposed adjacent the wheel 30, the carrier member 38 has a pair of concentric annular grooves 42 for receiving annular sealing rings 43 which are held in place by snap-rings 45. The sealing rings 43, which are preferably made from stainless steel, are angular in cross section and have resilient portions 46 which engage against the outer inclined surfaces of V-shaped annular lands 47 formed on the back of turbine wheel 30. By this means, leakage of the hot gas from the rearward side of the turbine is prevented. The hot gas entering the turbine unit 10 from the combustion chambers 12 and 13 is received in an annular space 48 defined by the inner surface of the nozzle annulus 15, the back of the turbine wheel 30, the outer sealing ring 43, the carrier member 38 and a ring 49 secured between the member and annulus 15. This gas exerts a pressure against the outer peripheral portion of the back of the turbine wheel 30 and thus counteracts the rearward axial thrust of the turbine wheel and this is an important feature of the invention. It is thus seen that except for its outermost peripheral portion, the back of the turbine wheel 30 is exposed to ambient air and is cooled thereby. The bearings 34 for the turbine wheel shaft 35 are supplied with lubricant forced through a tube 50 connected to a suitable pump (not shown). A sealing device 51 is employed for preventing loss of the lubricant from the forward end of the sleeve portion 33. Fast within an axial bore at the inner end of the turbine shaft 35 is a sleeve 52 having a splined inner surface adapted for driving connection with the compressor 11.

It will be observed from the foregoing that the turbine 10 is a self-contained unit capable of being made as a sub-assembly of the complete auxiliary power unit. It will also be apparent that the turbine 10 is particularly well adapted for convenient assembly and disassembly so that inspection of its internal parts and replacement thereof is greatly facilitated. To further facilitate the assembly and disassembly of the parts, the housing 32 and the carrier member 38 are connected by bolts 53 so that by removing the bolts 30', the bearing assembly, including the housing and carrier member can be detached from the nozzle annulus 15.

The hot gas turbine, which is of the radial inward-flow reaction type having radial blading has been found highly advantageous for several reasons. In the first place, fabrication of the turbine wheel is much simpler than for an axial-flow type wheel of comparable size. Moreover the structural strength of the present turbine wheel is superior to comparable wheels of the cantilever-blade radial-flow types. Furthermore, it has been determined that high efficiencies over a wide range of operating conditions are derived through the use of the instant turbine construction.

The compressor 11 has an air inlet connection opening 74 and double volute discharge ducts which are coupled with elbow shaped air ducts 101 and 102, respectively. The ducts 101 and 102 have extension portions 103 and 104, and forwardly extending portions or shells 105 and 106 which are arranged substantially parallel to the axis of the power unit and which constitute the outer housings or shells of the respective combustion chambers 12 and 13. The portions 103 and 104 of the elbow shaped ducts 101 and 102 are extended laterally in air discharge tubes or branches 107 and 108 having flanged ends by which suitable ducts (not shown) can be connected. The tubes 107 and 108 constitute bleed-offs through which air compressed within the compressor unit 11 can flow to the airplane pneumatic power system. Within the elbow ducts 101 and 102 are angular vanes 110 which serve to divide the compressed air so as to divert the proper amount into the shells 105 and 106. Disposed concentrically within the shells 105 and 106 are perforated tubes 112 which form extensions of the hot gas inlet tubes 22 and 23 of the turbine 10. The rearward end of each tube 112 is tapered and is connected to a sleeve 113 in which a fuel nozzle 115 is disposed, fuel being supplied to the nozzle through a tube 116 which is connected to a suitable fuel pump. The forward end of each shell 105 and 106 is connected to an enlarged portion 117 of the tube 112 by means of a clamping ring 118. A glow plug 119 (Fig. 1) extends through the side of each shell 105 and 106 and tube 112 and is connected in an electrical circuit, energization of the plugs serving to ignite the fuel to effect combustion of the latter. The compressed air entering the tubes 112 is thus heated within the combustion chambers 12 and 13 and enters the turbine unit through the curved inlet tubes 22 and 23 and is directed against the blades 29 of the turbine wheel 30 and expanded therein to rotate the latter at a high rate of speed.

The ambient air, upon entering the inlet opening 74 of the compressor unit 11, is compressed by the compressor and forced laterally through the volute discharge ducts 101 and 102 and into the combustion chambers 12 and 13 where the enthalpy of the compressed air is increased by the combustion of fuel therein, this being accomplished with as near an approach as is possible to a constant pressure desideratum. This higher energy level air is then directed by the curved inlet ducts 22 and 23 and the enclosure 18 through the nozzles to rotate the turbine wheel 30, the air then exhausting through the discharge tube 19.

It is to be noted that the mechanical design of the power unit is such that major components are made as separate assemblies capable of being readily interchanged. For example, the hot gas turbine has an independent bearing mounting and may be readily connected to or detached from the compressor as a complete assembly.

I claim as my invention:

In a turbine-compressor power plant, a hot gas turbine unit comprising: a casing having at least one hot gas inlet opening in its periphery through which hot gas can be introduced, said casing further defining an annular chamber for receiving said gas and an axial gas discharge opening at one end; a turbine wheel rotatably supported in said casing and having front and back faces; radial blades extending from the front face of the wheel; circumferentially extending sealing means between an adjacent wall of the casing and the back face of said wheel separating said back face into an inner portion having communication with ambient atmosphere, and an outer peripheral portion spaced from the adjacent casing wall and cooperating therewith to provide an annular space therebetween, said sealing means including a sealing member arranged for pressure activation in a direction towards a sealing position; a plurailty of circumferentially spaced inclined nozzle elements within said casing for discharging and directing the hot gas radially inwardly against said blades to rotate said wheel, said gas exhausting through said discharge opening and exerting a backward thrust on said wheel; and means defining a passage placing said peripheral portion in communication with the hot gas discharged from said nozzle elements, whereby the hot gas pressure acting on the back face peripheral portion exerts a forward thrust on said wheel which is substantially equal and opposite to the backward thrust, and activates said sealing member towards its sealing position.

References Cited in the file of this patent

UNITED STATES PATENTS

| | | |
|---|---|---|
| 1,130,616 | Lorenz | Mar. 2, 1915 |
| 1,634,317 | Benson | July 5, 1927 |
| 1,960,810 | Gordon | May 29, 1934 |
| 2,180,168 | Puffer | Nov. 14, 1939 |
| 2,283,176 | Birmann | May 19, 1942 |
| 2,465,846 | Clegern | Mar. 29, 1949 |
| 2,484,275 | Eastman | Oct. 11, 1949 |
| 2,577,179 | Buchi | Dec. 4, 1951 |
| 2,646,210 | Kohlmonn et al. | July 21, 1953 |

FOREIGN PATENTS

| | | |
|---|---|---|
| 202,042 | Germany | Dec. 5, 1908 |